A. W. ROSS.
UNWRAPPING MACHINE.
APPLICATION FILED SEPT. 26, 1917.

1,282,294.

Patented Oct. 22, 1918.
5 SHEETS—SHEET 1.

Witness

Inventor
Albert W. Ross,
By C. E. Humphrey
Attorney

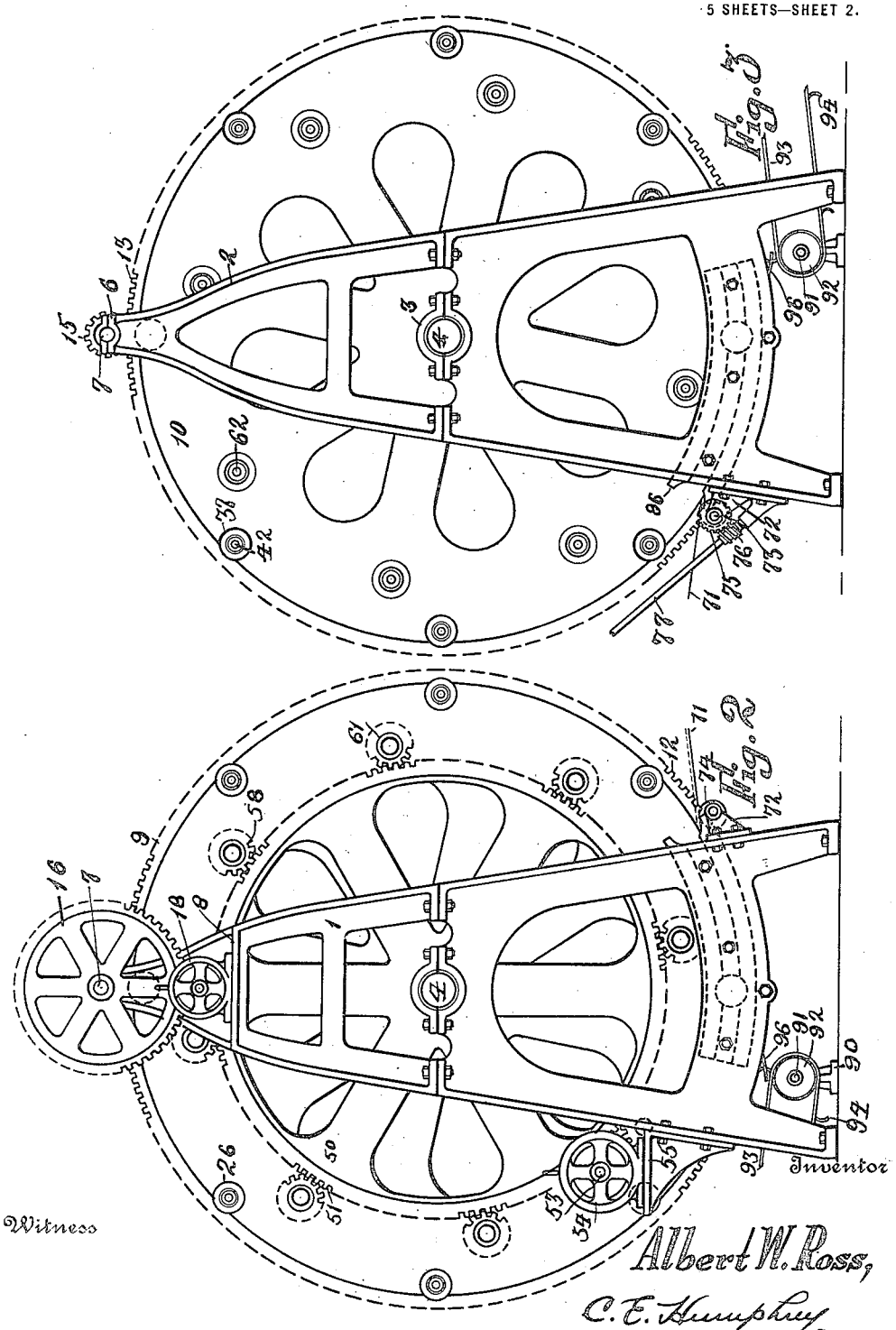

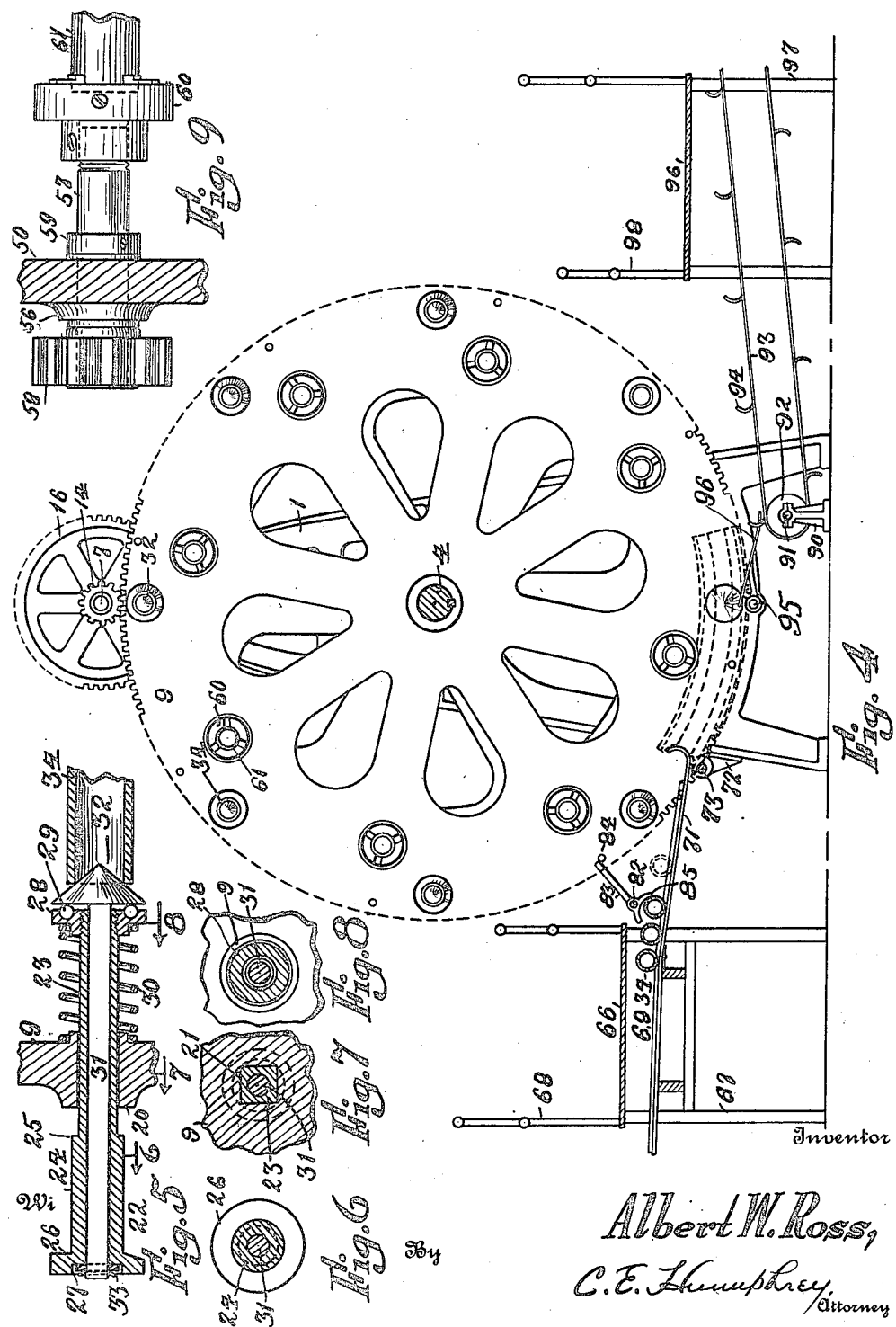

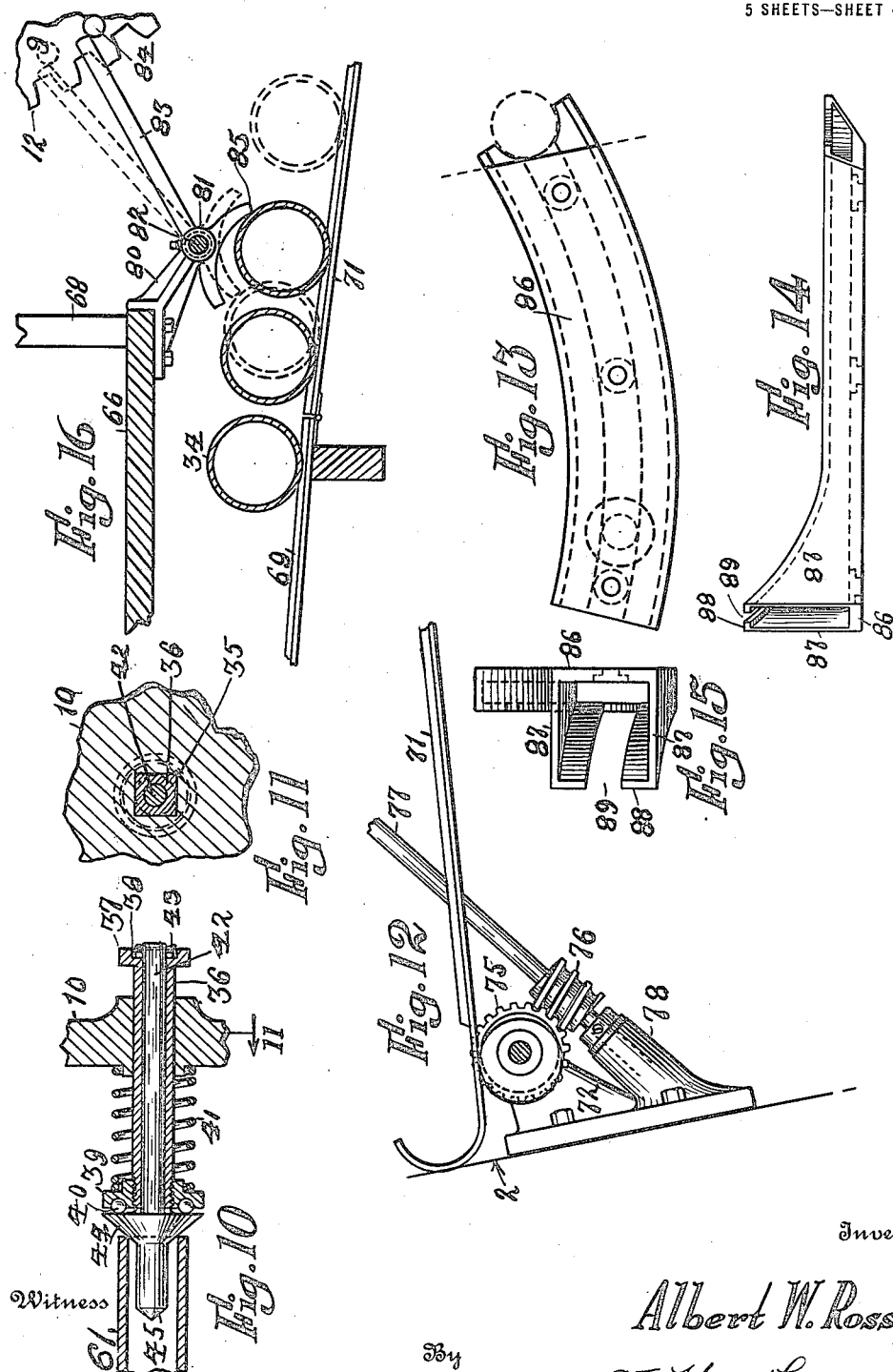

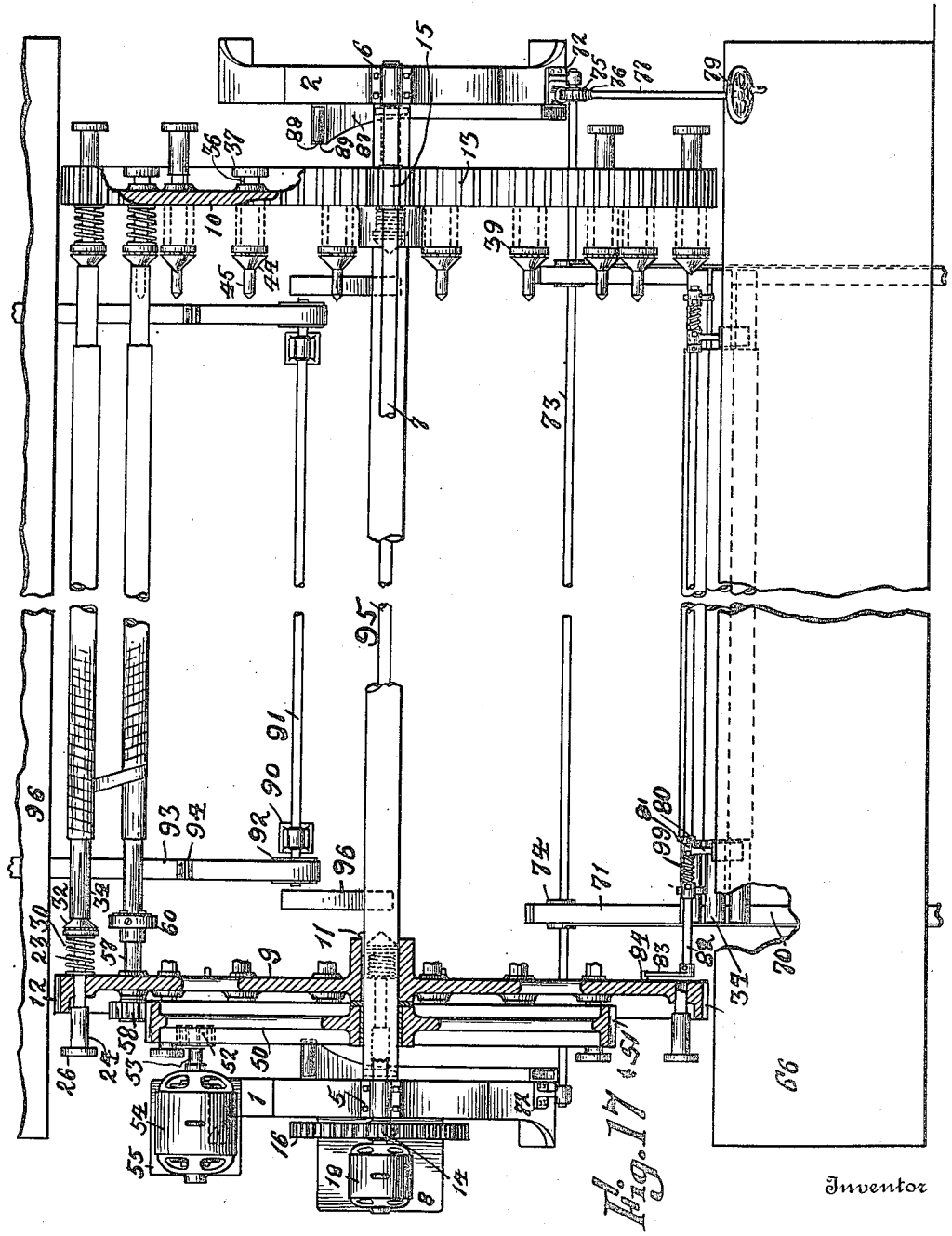

UNITED STATES PATENT OFFICE.

ALBERT W. ROSS, OF AKRON, OHIO.

UNWRAPPING-MACHINE.

1,282,294.	Specification of Letters Patent.	Patented Oct. 22, 1918.

Application filed September 26, 1917. Serial No. 193,347.

*To all whom it may concern:*

Be it known that I, ALBERT W. Ross, a citizen of the United States, residing at Akron, in the county of Summit and State of Ohio, have invented new and useful Improvements in Unwrapping-Machines, of which the following is a specification.

This invention relates to a machine for unwinding a helically disposed strip from an object and rewinding the same on a spool and has more especial relation to the unwinding of the strips of canvas or duck used for confining the inner tubes of double tube pneumatic tires while being vulcanized, after the vulcanizing operation and then rewinding them upon a suitable spool for reuse.

Briefly, in a large majority of cases the soft and highly resilient inner tubes of the double tube pneumatic tires are manufactured on straight, hollow mandrels by forming them thereon according to any approved process and inclosing them by helically-disposed strips during vulcanization, which strips are subsequently removed to permit the removal of the vulcanized inner tube from the mandrel. Experience has shown that the unwinding of the used fabric strip, and which we may state is subject to frequent reuse, is a long and laborious operation consuming time and labor. Therefore, the object of the invention is to provide a machine by which the helically-disposed strips may be quickly and easily unwound or removed and wound up on a suitable drum or spool to enable the strips to be reused for subsequent vulcanizations.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a view in side elevation of a machine embodying the present invention.

Fig. 2 is a view of the same machine looking from the left in Fig. 1.

Fig. 3 is a view similar to Fig. 2 looking from the right in Fig. 1.

Fig. 4 is a vertical transverse section of the device shown in Fig. 1.

Figs. 5, 6, 7 and 8 are detail views of the devices for holding previously wrapped mandrels.

Fig. 9 is an enlarged view of one of the heads for holding the winding spools onto which the strips are wound.

Fig. 10 is a sectional view of a device which is complemental to the device shown in Fig. 9 for holding the winding spool at the opposite end of the machine.

Fig. 11 is a sectional view taken approximately on line 11 of Fig. 10.

Fig. 12 is an enlarged detail view of the mechanism employed for adjusting the position of an automatic feed for picking up the mandrel carrying the mandrels.

Figs. 13, 14 and 15 are views of an ejector employed for withdrawing the members shown in Fig. 5 for engagement with each mandrel after the completion of the unwinding operation.

Fig. 16 is a detail of the device employed for controlling the feed of the wrapped mandrel to the device, and Fig. 17 is a plan view of the device shown in Fig. 1 with portions thereof broken away to better illustrate the construction of the device.

Figure 1:
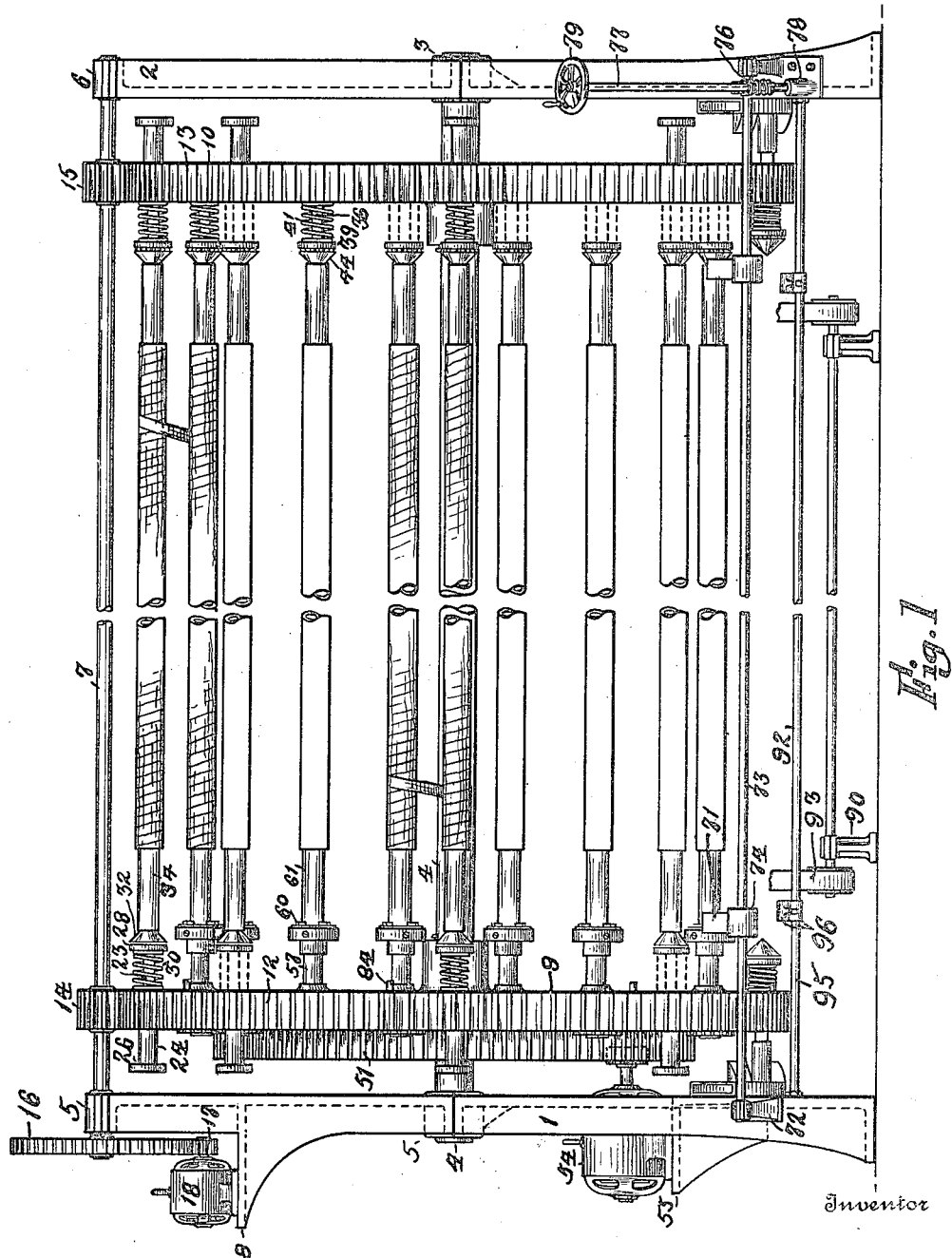

Referring to the drawings in detail the reference numerals 1 and 2 denote two oppositely-disposed upright housings which are generally in the form of an upright A with properly disposed legs for sustaining the same on a supporting instrumentality and provided with transverse bars in each of which are positioned bearings 3 for a horizontal shaft 4. The housing 1 is provided at its apex with a bearing 5 and the housing 2 is provided at its apex with a bearing 6. Extending between these bearings 5 and 6 is a shaft 7. The housing 1 is further provided with an outwardly-projecting shelf or bracket 8 for a purpose to be later described. Fixedly mounted on the shaft 4 within the housings 1 and 2 and adjacent to each, are a pair of heads 9 and 10, which are held in position by means of keys or other means 11. The peripheral faces of the two heads 9 and 10 are provided with spur gear teeth 12 and 13 respectively. These teeth are formed on outwardly and oppositely disposed flanges on the heads and the remainder of the heads are comparatively thin and are fashioned with suitable hubs for the shaft 4. On the shaft 7 are a pair of pinions 14 and 15 which are arranged to intermesh respectively with the gear teeth 12 and 13. On the shaft 7 outside of the bearing 5 is a spur gear 16 arranged to intermesh with a pinion 17 on the armature shaft of a motor 18 mounted on the shelf or bracket 8 so that as the armature of the shaft 18 is rotated at a relatively high speed the shaft 17 is driven at a slower speed and the two heads 12 and 13 revolve in unison at a still slower speed on the shaft 4 as an axis.

The head 9 is provided with a plurality of equidistant seats arranged near the peripheral portion thereof in each of which is mounted a clamping member for holding the mandrel carrying the vulcanized tube and in the head 10 and oppositely disposed to the seats in the head 9 are seats for complemental clamping members arranged to hold and sustain the opposite ends of the mandrels. There will be the same number of clamping members in each head and they will be disposed in even series around each head and near the peripheral portions thereof and in the drawings there are shown eight seats in each head for this purpose. As the form of clamping members employed in connection with both heads is similar the construction of only one of the clamping members employed in connection with the head 9 will be described and reference is directed especially to Figs. 5, 6, 7, 8 and 17. Each seat in the head 9 consists of a hub or boss 20 provided with a square aperture 21 extending therethrough and constituting a holding means or bearing for the clamping member. The clamping members for both of the heads 9 and 10 are all similar and it is thought that a description of one will be sufficient for the understanding of them all.

Each clamping member embodies a sleeve 22 having a square shaped inwardly-extending shank 23 ordinarily arranged to seat in a square aperture in the boss 20, and outside of the head 9 is an enlarged cylindrical portion 24 providing a shoulder 25 for a purpose to be later described. The outer end of the enlarged cylindrical portion 24 is provided with a cylindrical flange or head 26 in which is a recess 27. The inner end of the square portion or shank 23 is threaded to receive a cap 28 and in the inner face of which is a ball race to hold friction reducing balls 29 for a purpose to be later described. Between the cap 28 and the inner face of the head 9 is a coiled spring 30 the normal tendency of which is to force the cap 28 inwardly toward the center of the device. Rotatably mounted in the sleeve 22 is a shaft 31, provided on its inner end with a conically formed head 32 and at its opposite end with a collar 33 adapted to seat in the recess 27. By the construction of the foregoing the entire sleeve 22 is normally forced inwardly toward the center of the machine by means of the spring 30 and its inward movement is limited by the engagement of the shoulder 25 with the boss 20 and outward movement of the clamp is resisted by the spring 30 so as to constitute means for clamping one end of the mandrel 34 containing an inner tube during the unwinding of the confining material such as canvas or duck.

The rear face of the conical head 32 is adapted to engage the balls 29 running in the race in the cap 28 to reduce friction incident to the rotation of the shaft 31 during the unwinding operation. Under normal conditions the spring 30 forces the conical head 32 inwardly toward the center of the device until further movement is interrupted by the engagement of the shoulder with the rear face of the boss 20 on the member 9. The positioning of a mandrel 34 against the conical face of the head 32 serves to compress the spring 30 slightly sufficient to set up a frictional engagement between the head 32 and the mandrel 34 causing the rotation of the shaft 31 and the friction incident to this rotation with regard to the cap 28 is reduced through the medium of the friction reducing balls 29. Opposite to each of the clamping members in the head 9 is a complemental clamping member which is identically similar in construction to the clamping member in the head 9 and hence it is thought a further description of the clamping members in the head 10 is unnecessary and it is thought that an understanding of both can be obtained from the foregoing description and an inspection of Figs. 5, 6, 7 and 8 of the drawings.

Mounted for loose revolution on the shaft 4 between the housing 1 and the head 9 is a wheel 50 the outer face of which is provided with spur teeth 51. Arranged to intermesh with the teeth 51 is a pinion 52 mounted on the armature shaft 53 of a motor 54 positioned on a bracket 55 secured to one of the legs of the housing 1. Arranged in the head 9 and equidistant with respect to the axis of the shaft 4 and equidistant with respect to the distance between each other and also each equidistant with respect to the shaft 4 are a plurality of bearings 56. Customarily each bearing 56 will be disposed slightly in advance of each clamping member with regard to the phase of movement of the head 9 and each positioned radially inward therefrom and as the mechanism contained in each bearing is similar to the others a description of one mechanism is believed to be sufficient for the understanding of them all and reference is especially directed to Fig. 9. Mounted in each bearing 56 is a shaft 57 on the outer end of which is mounted a spur pinion 58 so positioned as to intermesh with the gear teeth 51 on the wheel 50. Inside of the wheel 50 the shaft is provided with a collar 59 for preventing longitudinal movement of the shaft 57. Secured on the inner end of each shaft 57 by any preferred means is a chuck 60 usually of the common three jaw universal variety for grasping the end of a hollow takeup spool or core 61 which is inserted therein. From the foregoing it will be seen that these chucks 60 are rotated by means of the revolution of the wheel 50 independently of the movement of the heads 9 and 10 which carry the mandrels containing the wrapped inner tubes.

The head 10 is provided with a plurality of bearings arranged in identically similar relative positions therein as are the shafts 57 in the head 9 and each oppositely disposed to one of said chuck bearing shafts 57. Each of these bearings constitute a bearing and supporting medium for a spring clamping device which is complemental to one of the chucks 60. Each of these clamping members comprises a square tubular member 36 the outer end of which is provided with an enlarged flange 37 provided with a recess 38 and at its opposite end is threaded to receive a cap 39 the inner face of which is provided with a ball race for friction reducing balls 40 and between the cap 39 and the inner face of the head 10 is a coil spring 41 which serves the same purpose as the spring 30. Rotatably mounted within the member 36 is a shaft 42 bearing at its outer end a collar 43 arranged to seat in the recess 38 and assist in holding the shaft 43 from longitudinal movement with respect to the member 36. Mounted on the inner end of the shaft 43 is a conically-shaped head 44 the outer face of which engages the balls 40 during the rotation thereof and it is further provided with an inwardly-projecting stem 45 which projects into the mandrel 61 and the function of which will be described later.

The tube forming mandrels 34 on which are mounted the vulcanized inner tubes, properly wrapped with a helical winding of retaining and compressing bands of fabric are fed to the device for unwrapping the fabric by the following mechanism.

Positioned on the feeding side of the device is a platform 66 mounted on supports 67 and customarily provided with guard rails 68. This platform, supports and guard rails may be of any preferred construction. Mounted on the frame which supports the platform 66 is a delivery chute 69 along which the mandrels are adapted to roll usually in substantially close contact and this chute comprises a pair of bars 70 to the ends of which are hinged bars 71 the inner ends of which are upturned in hook shape.

These bars 70 and 71 are in parallelism and are positioned inwardly from the two heads 9 and 10 as clearly shown in Fig. 17. Secured to the housings 1 and 2 are brackets 72 provided with bearings for a transversely-extending shaft 73. Mounted on the shaft 73 is a pair of eccentrics 74 each of which is so positioned that the under face of one of the hinged bars 71 rests thereon and the free end of which is raised or lowered a slight distance by the rotation of the eccentric. The shaft 73 also bears at one end adjacent to the housing 2 a worm-wheel 75 which is engaged by a worm 76 on a shaft 77 mounted in a bearing 78 on the housing 2. The shaft 77 will usually be provided at its outer end with an operating wheel 79 by which it is rotated. The reason for providing the hinged delivery bars 71 and providing means for raising or lowering the outer ends thereof is to adjust the position of the ends of the bars so that when the downward movement of a mandrel is terminated by the hooked ends of the bars 71 and is engaged by the clamping members absolute registration of the mandrel with the clamping members may be obtained, this being due to the fact that the machine is adapted for use in connection with mandrels for making different sizes of inner tubes.

In order to control the feed of the mandrels to the device it is imperative that they be fed singly one by one into a position to be engaged by the clamping members or in other words to seat singly in the hooked-shaped ends of the bars 71 and hence in order to regulate and control the spacing or intermittent feed of the mandrels to the device the following mechanism is employed. Secured to the platform 66 or other suitable support are brackets 80 provided with bearings 81 in which is mounted a shaft 82 at one end of which is mounted an arm 83 which is adapted to be engaged intermittently by pins 84 on one of the heads of the device. Mounted on the shaft 81 and spaced from the brackets 80 at opposite ends of the device are feeding arms each consisting of a hub provided with an aperture to receive the shaft 82 and also provided with two widely diverged arms 85. These feeding devices are mounted on the shaft 82 and are adapted to be alternately rocked or oscillated by the movement incident by the engagement of the arm 83 with the pins 84 on one of the heads of the device. Positioned between each bracket 80 and each feeding member 85 is a coiled spring 99 the function of which is to hold the arm 83 in closer position to be engaged by the pins 84 on one of the heads of the device during the revolution of the latter. It will be obvious, of course, that as there are two members 85 positioned at opposite ends of the shaft 81 uniform control of the feed of the mandrels containing the tubes will be secured. The mandreds after the unwinding of the fabric therefrom, which operation will be described later, are moved from the device automatically by the following mechanism. It may be pointed out that the clamping members which are mounted in the head 9 are provided with cylindrical projecting ends 24, on the outer ends of which are flanges 26, and these clamping members are normally held in their inward or operative position so as to engage the end of a mandrel by means of the coiled springs 30 and it will be obvious, of course, that if the clamping members are shifted outwardly away from the mandrels, the mandrels will then be released. In order to effect automatically the intermittent outward movement of the clamping members to their inoperative position there is positioned on the housings 1 and 2, ejectors which engage the flanged ends of the clamping members and gradually withdraw the clamping members to their inoperative positions and out of engagement with the mandrels. These ejectors each consist of a box-like structure shown best in Figs. 13, 14 and 15 and each comprises a body portion 86 having side walls 87 and a curved inner wall 88 in which is a slot 89 large enough to accommodate the cylindrical portion 24 of the clamping members but smaller than the flanged heads 26. Furthermore, the ejectors are wider transversely at one end than the other and the slot 89 extends throughout the wall 28. These ejectors are so positioned that during the orbital movement of each clamping member the projecting end of each clamping member will engage therein and the flanged head 26 engage the interior face of the wall 88 and during the passage of the head through said ejector and each clamping member will gradually be withdrawn from engagement with the mandrel, the clamping member returning to its operative position after the passage through the ejector and after the release of the mandrel held thereby. These ejectors are positioned at the lower portions of the housings and suitably positioned to withdrawn the clamping members on the heads 9 and 10 from engagement with the mandrel after the unwinding operation has taken place.

The rubber covered mandrels from which the tape or binding fabric has been removed are carried to a suitable place by means of a pair of conveyer belts which are supported as follows: Mounted on the floor below the machine are a pair of upright bearings 90 in which is mounted a rotatable shaft 91 bearing outside of the bearings a pair of pulleys 92 around each of which passes a conveyer belt 93 provided with hook-shaped lugs 94 the lugs on the two belts being in transverse alinement. Mounted on suitable supports 95 are a pair of guides 96 which are customarily positioned outside of the ends of the shaft 91 and are inclined from the position occupied by the mandrel after the withdrawal of the clamping members from engagement therewith so that the mandrels thus freed from engagement with the clamping members will roll down the two guides 96 and are picked up by the lugs 94 on the conveyer belt 93 and conveyed to any suitable or designated place. In order to support an operator as will more fully appear later there is provided a platform 96 mounted on supports 97 and usually provided with guard rails 98 placed adjacent to the delivery portion of the device.

The operation of the device is as follows: The mandrels covered with vulcanized tubes wrapped helically about with a strip of fabric are fed along the chute 69 in substantially close contact and their progress is interrupted by the feeding device embodying the feeding device 85 on the shaft 82 which allows each mandrel to roll down singly over the bars 71 and their descent is terminated by their engagement with the upturned hooked ends of these two bars and when in this position they are in alinement with the clamping members on the heads 9 and 10. The heads 9 are slowly revolving due to the mechanism already described embodying the motor 18, pinion gear 17, spur gear 16, shaft 7, pinion gear 14, which intermeshes with the teeth 12 on the outer face of the head 9 and at the same time the pinion gear 15 on the shaft 7 simultaneously rotates the head 10 by its engagement with the teeth 13 thereon. Each mandrel will be so positioned when held at the termini of the bar 71 that when the flanged heads 26 of the clamping members pass out from engagement with the ejector they will be in axial alinement with the open ends of the mandrels held on these bars and will by virtue of the springs 30 be snapped into operative engagement with the mandrel and move the same orbitally to the left in Fig. 4 until in a position, where an operator standing on the platform 66 can attach one end of the strip of fabric to the adjacent spool 61. The spools 61 are all rotated simultaneously and by common mechanism, hence a description of one is believed sufficient for the rest. The spools are all rotated by the revolution of the wheel 50 which is provided with spur teeth 51 intermeshing with the pinions 58 on the clutch holding the shafts 57 each of which serves to sustain in unison with the companion member on the head 10 a core or spool. The wheel 50 is revolved through the medium of the motor 54, the shaft of which bears a spur gear 52 intermeshing with the spur teeth 51 so that the cores or spools are rotated constantly during their orbital movement and the orbital movement of the mandrels 34.

During the orbital movement of the spools from the position near the platform 66 where the tape or binding material is applied, to a position near the platform 96 the strip of confining or inclosing material used for vulcanizing is wound up on the adjacent spool and the unwinding operation from the vulcanized tube to the spool is substantially completed by the time that the mandrel containing the vulcanized tube has reached the position adjacent to the platform 96. When the spools have been substantially filled they are removed manually by the operator on the platform 96. The mandrels 34 which are held by the clamping members 22 pass downwardly beyond the platform 96, the flanged heads 26 of the clamping members pass into the open mouthed ends of the ejectors secured to the housings which it will be noticed are provided with sharp covered inner faces which quickly withdraw the clamping members from engagement with the mandrel allowing the mandrels to drop onto the two guides 96 from which they roll into place on the conveyer belts 93 and are picked up by the lugs 94 and conveyed to a place where the inner tubes are stripped therefrom and the mandrels returned for reuse. The passage of the flanged heads 26 from engagement with the ejectors is coincident with the positioning of the mandrel at the hooked ends or termini of the bars 71 so that each pair of clamping members as soon as they pass from said engagement will engage a wrapped mandrel.

It will be further pointed out that the machine is adapted for use in connection with mandrels of various diameters and hence in order to adapt the device so that the clamping members will engage mandrels of different diameters the adjusting device shown in Fig. 12 is employed so as to raise the ends of the arcuate or hooked portions of the members 71 into proper position to sustain the mandrels so that their axes will coincide with the axes of the clamping members by which they are to be engaged. In case of large mandrels the arcuate end of the member 71 will be lowered and in case of smaller mandrels the free ends of the member 71 will be raised so as to make the axes of the clamping members and the mandrels coincident in so far as possible. During the movement of the device the mandrels are fed downwardly to the device by means of the rocking arms 85 of the feeding device which is secured by engagement of the arm 83 with properly positioned pins 84 on the inner faces of the head 9.

I claim,

1. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, a spool mounted adjacent to each mandrel, means on said heads for holding said spools, means to simultaneously revolve all of said spools to unwind helically-disposed strips on the tubes on said mandrels during their orbital movement.

2. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, a spool mounted adjacent to each mandrel, means on said heads for holding said spools, means to simultaneously revolve all of said spools to unwind helical strips disposed on the tubes on said mandrels during their orbital movement, and means to automatically release the mandrel clamping means from said mandrels in their orbital movement.

3. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, a spool mounted adjacent to each mandrel, means on said heads for holding said spools, means to simultaneously revolve all of said spools to unwind helical strips disposed on the tubes on said mandrels during their orbital movement, and means to feed the tube inclosed mandrels to said device.

4. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, a spool mounted adjacent to each mandrel, means on said heads for holding said spools, means to simultaneously revolve all of said spools to unwind helical strips disposed on the tubes on said mandrels during their orbital movement and means to control the feed of mandrels inclosed by the vulcanized tubes to said device.

5. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, a spool mounted adjacent to each mandrel, means on said heads for holding said spools, means to simultaneously revolve all of said spools to unwind helical strips disposed on the tubes on said mandrels during their orbital movement and means to convey the unwrapped mandrels to a designated place.

6. A machine of the class designated comprising a pair of spaced housings, a rotatable shaft extending therebetween, means to rotate said shaft, a pair of heads fixedly mounted on said shaft, mandrel clamping members on said heads, spool holders on said heads, said spool holders arranged in close proximity to said clamping members, spools on said spool holders, means to revolve said spool holders simultaneusly and means to feed wrapped mandrels to said device.

7. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, spool holders mounted in each head, the spool holders on one head provided with projecting shafts, pinion gears mounted on said shafts, a toothed wheel mounted on said shaft, the teeth of which are arranged to intermesh with said pinion gears, means to revolve said wheel independently of the revolution of said heads.

8. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, spool holders mounted in each head, the spool holders on one head provided with projecting shafts, pinion gears mounted on said shafts, a toothed wheel mounted on said shaft, the teeth of which are arranged to intermesh with said pinion gears, means to revolve said wheel independently of the revolution of said heads and means to feed wrapped mandrels to said device.

9. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, spool holders mounted in each head, the spool holders on one head provided with projecting shafts, pinion gears mounted on said shafts, a toothed wheel mounted on said shaft, the teeth of which are arranged to intermesh with said pinion gears, means to revolve said wheel independently of the revolution of said heads and means to feed the wrapped mandrels to said device singly, said means embodying mechanism controlling said feed, whereby the feed of said mandrels is synchronous with respect to the rotation of said wheel.

10. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, spool holders mounted in each head, the spool holders on one head provided with projecting shafts, pinion gears mounted on said shafts, a toothed wheel mounted on said shaft, the teeth of which are arranged to intermesh with said pinion gears, means to revolve said wheel independently of the revolution of said heads and means to withdraw said clamping means from said mandrel to permit the release of said mandrels from said device and means to convey said mandrels to a designated place.

11. A machine of the class designated comprising a pair of spaced housings, a rotatable shaft extending therebetween, means to rotate said shaft, a pair of heads fixedly mounted on said shaft, a series of mandrel clamping means carried by each head and arranged to hold the mandrels in parallelism with respect to said shaft during their orbital movement, spool holders mounted in each head, the spool holders on one head provided with projecting shafts, pinion gears mounted on said shafts, a toothed wheel mounted on said shaft, the teeth of which are arranged to intermesh with said pinion gears, means to revolve said wheel independently of the revolution of said heads, means to withdraw said clamping members from said mandrels to permit the release of said mandrels from said device and means to feed the wrapped mandrels to said device, the delivery of said mandrels being synchronous with the termination of engagement of said clamping means with said releasing means.

In testimony whereof I have hereunto set my hand.

ALBERT W. ROSS.